Patented Aug. 3, 1937

2,088,912

UNITED STATES PATENT OFFICE 2,088,912

2,4-DIMETHYL-3-OR-5-NITROBENZYLCHLORIDE AND PROCESS FOR MANUFACTURING THE SAME

Hans Lange and Otto Hoffmann, Dessau in Anhalt, Germany, assignors to General Aniline Works, Inc., New York, N. Y., a corporation of Delaware No Drawing. Application March 19, 1936, Serial No. 69,668. In Germany April 4, 1935

6 Claims. (Cl. 260—142)

The methods known from the literature for introducing chloromethyl groups into aromatic hydrocarbons by means of formaldehyde and hydrochloric acid have been found to fail in the case of nitrohydrocarbons either completely or at best with yields which are technically commercially insufficient. For example, it is not possible to introduce chloromethyl groups into nitrobenzene while in the case of the nitrotoluenes the corresponding benzylchlorides are produced only in quite insufficient quantities.

This invention relates to a method of introducing chloromethyl groups into 1,3-dimethyl-2-nitrobenzene and 1,3-dimethyl-4-nitrobenzene by means of formaldehyde and hydrochloric acid, whereby the products are obtained in commercially good yields of over 80 per cent. of the theoretical. This reactivity could not be foreseen and it is the more surprising because with all the other four isomeric nitroxylenes, the reaction either does not occur or at most proceeds with commercially useless yields.

The new nitrodimethylbenzylchlorides may be converted by reduction into the corresponding aminotrimethylbenzenes, bodies which are only accessible with difficulty in another manner; thus these new nitro-derivatives are valuable intermediate products in the manufacture of dyes.

The following examples illustrate the invention the parts being by weight:—

*Example 1.*—151 parts of 1,3-dimethyl-2-nitrobenzene, 75 parts of paraformaldehyde, 75 parts of zinc-chloride and 14 parts of concentrated hydrochloric acid are heated together at 65 to 70° C. and hydrogen chloride is introduced into the mass for 20 hours whilst stirring. The whole is now poured into water; the oil is extracted with benzene and the benzene solution is washed until neutral. By fractional distillation of the oil in a vacuum there are obtained 168 parts (84 per cent. of the theoretical) of 2,4-dimethyl-3-nitrobenzylchloride of boiling point 148 to 149° C. under 11 mm. pressure. When recrystallized from benzine, the product melts at 61 to 62° C.

*Example 2.*—151 parts of 1,3-dimethyl-4-nitrobenzene, 75 parts of poly-hydroxymethylene, 75 parts of zinc chloride and 14 parts of concentrated hydrochloric acid are heated together at 65 to 70° C. and the mass is worked up in the manner described in Example 1. There are obtained 161 parts (81 per cent. of the theoretical) of 2,4-dimethyl-5-nitrobenzylchloride of boiling point 162 to 164° C. under 11 mm. pressure. When recrystallized from benzine, the product forms nearly colorless prisms at melting point 50 to 51° C.

According to the foregoing examples use is made of polymerized formaldehyde, since this method is the simplest form of application of formaldehyde. Nevertheless, use may be made of gaseous formaldehyde or solutions thereof. In the claims following hereafter the term formaldehyde is intended to include as well the monomolecular as the polymerized product.

What we claim is:—

1. The dimethylnitrobenzylchlorides which correspond to the general formula

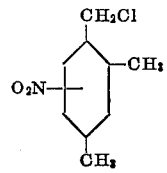

the NO₂ group being in meta-position to the CH₂Cl group.

2. 2,4 - dimethyl-3-nitrobenzylchloride boiling at 148 to 149° C. under 11 mm. pressure and melting at 61 to 62° C.

3. 2,4 - dimethyl-5-nitrobenzylchloride boiling at 162 to 164° C. under 11 mm. pressure and melting at 50 to 51° C.

4. The process which comprises reacting a dimethylnitrobenzene of the general formula

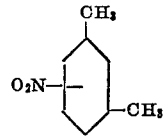

the NO₂ group being in ortho-position to one of the CH₃ groups, with formaldehyde and hydrochloric acid.

5. The process which comprises reacting 1,3-dimethyl-2-nitrobenzene with formaldehyde and hydrochloric acid.

6. The process which comprises reacting 1,3-dimethyl-4-nitrobenzene with formaldehyde and hydrochloric acid.

HANS LANGE.
OTTO HOFFMANN.